(12) United States Patent
Wills et al.

(10) Patent No.: US 8,856,346 B2
(45) Date of Patent: Oct. 7, 2014

(54) STATEFUL PUSH NOTIFICATIONS

(75) Inventors: Fergus M. Wills, Belfast (GB); David J. McTavish, Belfast (GB)

(73) Assignee: Unwired Planet, LLC, Reno, NV (US)

( * ) Notice: Subject to any disclaimer, the term of this patent is extended or adjusted under 35 U.S.C. 154(b) by 2062 days.

(21) Appl. No.: 11/026,675

(22) Filed: Dec. 30, 2004

(65) Prior Publication Data

US 2005/0169285 A1  Aug. 4, 2005

Related U.S. Application Data

(60) Provisional application No. 60/537,301, filed on Jan. 15, 2004.

(51) Int. Cl.
| | |
|---|---|
| *G06F 15/16* | (2006.01) |
| *H04L 29/08* | (2006.01) |
| *H04L 29/06* | (2006.01) |
| *H04L 29/12* | (2006.01) |

(52) U.S. Cl.
CPC ........... *H04L 67/2804* (2013.01); *H04L 69/329* (2013.01); *H04L 29/12047* (2013.01); *H04L 67/142* (2013.01); *H04L 67/28* (2013.01); *H04L 67/2819* (2013.01); *H04L 61/15* (2013.01); *H04L 67/02* (2013.01); *H04L 67/26* (2013.01); *H04L 29/06* (2013.01); *H04L 67/2842* (2013.01)
USPC ........................................................ 709/227

(58) Field of Classification Search
USPC .................................. 709/217–219, 227–229
See application file for complete search history.

(56) References Cited

U.S. PATENT DOCUMENTS

| | | | | |
|---|---|---|---|---|
| 6,161,123 A * | 12/2000 | Renouard et al. | ............. | 709/203 |
| 6,374,305 B1 * | 4/2002 | Gupta et al. | .................. | 709/246 |
| 6,421,781 B1 * | 7/2002 | Fox et al. | ........................... | 726/4 |
| 6,654,786 B1 * | 11/2003 | Fox et al. | ...................... | 709/203 |
| 6,718,369 B1 * | 4/2004 | Dutta | ............................ | 709/206 |
| 6,742,127 B2 * | 5/2004 | Fox et al. | ......................... | 726/10 |
| 6,748,450 B1 * | 6/2004 | Dutta | ............................ | 709/246 |
| 6,970,918 B2 * | 11/2005 | Brown et al. | ................. | 709/219 |
| 7,003,565 B2 * | 2/2006 | Hind et al. | .................... | 709/224 |
| 7,020,685 B1 * | 3/2006 | Chen et al. | .................... | 709/204 |
| 7,051,073 B1 * | 5/2006 | Dutta | ............................ | 709/206 |
| 7,136,364 B2 * | 11/2006 | Saint-Hilaire et al. | ........ | 370/331 |
| 7,136,645 B2 * | 11/2006 | Hanson et al. | ............. | 455/435.1 |
| 7,293,107 B1 * | 11/2007 | Hanson et al. | ................ | 709/245 |
| 7,299,349 B2 * | 11/2007 | Cohen et al. | .................. | 713/150 |
| 2002/0046352 A1 * | 4/2002 | Ludwig | ......................... | 713/201 |
| 2002/0147645 A1 * | 10/2002 | Alao et al. | ...................... | 705/14 |
| 2002/0162120 A1 * | 10/2002 | Mitchell | ........................ | 725/135 |
| 2003/0028647 A1 * | 2/2003 | Grosu | ............................ | 709/227 |
| 2004/0133686 A1 * | 7/2004 | Skog et al. | ..................... | 709/228 |
| 2004/0199665 A1 * | 10/2004 | Omar et al. | .................... | 709/238 |
| 2005/0033845 A1 * | 2/2005 | Perepa et al. | ................. | 709/226 |
| 2005/0083929 A1 * | 4/2005 | Salo et al. | ...................... | 370/389 |

\* cited by examiner

*Primary Examiner* — Alicia Baturay (57) ABSTRACT

According to one embodiment of the invention, a method for forming a push notification and pushing the push notification and client state information to a client device is provided. In addition, a method for processing the push notification and client state information is provided. In one embodiment, processing may include embedding metadata with the client state information.

31 Claims, 7 Drawing Sheets

STATEFUL PUSH NOTIFICATIONS

This patent application claims the benefit of U.S. Provisional Patent Application No. 60/537,301, filed on Jan. 15, 2004 and entitled, "Stateful Push Notifications," which is incorporated herein by reference.

TECHNICAL FIELD

One embodiment of the invention relates to the field of communication. More specifically, the invention relates to communication networks.

BACKGROUND

Personal mobile communication/computing devices such as cellular telephones, personal digital assistants (PDAs), two-way pagers and the like are sometimes collectively called "mobile devices". The latest generations of mobile devices provide their users with the ability to access resources on the Internet via wireless telecommunications networks ("wireless networks"). For example, some of these mobile devices allow their users to access World Wide Web pages, exchange email and/or instant messages, and download files over the Internet.

A device known as a proxy gateway is often used to facilitate access by mobile devices to the Internet. The proxy gateway relays ("proxies") requests and responses between mobile devices (clients) on the wireless network and servers on the Internet. Typically, the proxy gateway is implemented in a conventional server-class computer system that is coupled between the wireless network and the Internet. This computer system includes a gateway that translates/converts between the languages and protocols used on the Internet and the languages and protocols used by mobile devices. For example, the Internet is based mainly on the use of hypertext transfer protocol (HTTP) and languages such as hypertext markup language (HTML) and extensible markup language (XML); mobile devices, on the other hand, commonly use wireless access protocol (WAP) and wireless markup language (WML) for purposes of Internet access.

In a client-server architecture such as described above, information may be provided to a client device (e.g., a mobile device) using either a "pull" model, a "push" model, or both. In the pull model, the client must explicitly request specific content, and the content is then provided to the client in response to the specific request. In the push model, information is provided to a client without the content having been explicitly requested (although the user may have had to initially subscribe to the push service).

A push proxy gateway is a device that may be used to facilitate a push service in order to allow mobile devices to receive Internet content. A push proxy gateway can be accessed using the Push Access Protocol (PAP). A push proxy gateway enables efficient delivery of e-mail, software, information, etc. PAP allows a server to initiate the transfer of content to one or more client wireless devices. The transfer may be initiated with a push notification, such as an alert, which indicates a link (e.g., a uniform resource identifier (URI)) to a resource (e.g., a file, image, software, web page, etc.) on an origin server. Once the push notification is activated via the resource link (e.g., by the user clicking on the URI), the user's device retrieves the resource.

Figure 1:
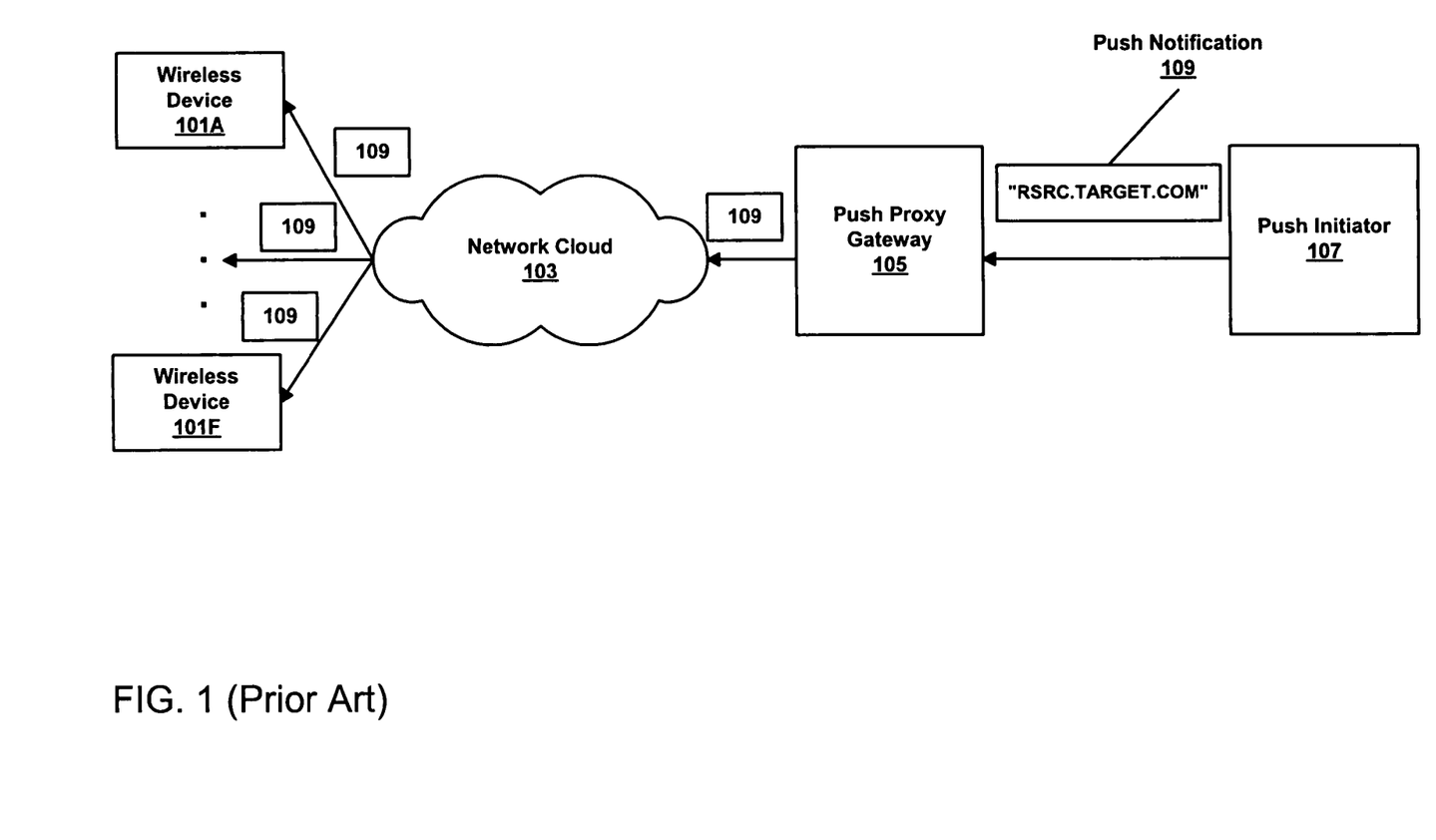
FIG. 1 shows an example of a push notification being pushed to a set of wireless devices.

FIG. 1 shows an example of a push notification being pushed to a set of wireless devices. A Push Initiator 107 transmits a push notification 109 to a push proxy gateway (PPG) 105. The push notification 109 indicates a resource link and set of one or more client recipients. The PPG 105 transmits the push notification 109 to a network cloud 103. The network cloud 103 transmits the push notification 109 to a set of wireless devices 101A-101F in accordance with the push notification 109 that indicates recipients (e.g., by IP address, cell phone number, etc.) and particular applications on the target client device. Application-level addressing permits pushed content to be targeted to a specific application on the device. Where there are multiple independent applications on the device, content may be targeted to a particular application by specifying the application identifier (ID) in the push request.

When the resource link of the notification is positively activated, (e.g., user selects the URI), the wireless application gateway (WAG) manages the resulting "pull" transaction. A wireless device 101A-101F may send one or more encoded WAP requests to the WAG, which then decodes the encoded WAP request. The WAP request may be translated into one or more HTTP requests and a request for a cookie. The WAG passes the requests to the origin server or resource host. The origin server creates a cookie for the requesting wireless device and passes the cookie data to the requesting wireless device. The cookie data file is stored on the requesting wireless device. While WAP Push applications are being used for the delivery of content to wireless devices, the current paradigm of message passing is inefficient, requiring round-trip delays, and consuming undesirable amounts of bandwidth.

The traditional model for delivering a push message to a wireless device also has other limitations. Although WAP Push client addressing permits user-defined addressing and device addressing, a pushed notification is targeted to a specific client device, rather than to a specific user of a client device. For example, a notification of new e-mail can be sent to a client device. The notification identifies an address, such as a URI, from which the e-mail can be retrieved. The e-mail is retrieved and downloaded to the client device after any user clicks on the address specified by the notification.

Any user-specific addressing provided by a push initiator is lost in the logical-to-physical mapping. For example, a push proxy gateway receives a client address to which the notification should be delivered. Where the addressing scheme is user-specific, addressing that allows a user to be addressed without the push initiator also supplying the physical identity of the client device, the push proxy gateway maps the given logical user address to a physical device. A look-up in a database may be performed to determine the appropriate physical address for the intended user and the logical user address, in the control portion of the Push Access Protocol (PAP) message, is discarded. The content portion of the push notification is directed to the intended device. Since a user of the intended device is not validated, any user who is aware of the address can access the resource URI in the notification.

Typically, client state information, such as cookies, are created by an application server or resource host and associated with a particular domain residing on the resource host. When a user requests to access the particular domain using an application on the client device, the client device searches for cookies pertaining to the particular domain. Accordingly, client state information may be provided to any requesting application on the client device. However, in many instances, a domain is optimized for particular applications. Applications that are disfavored for accessing the domain are not screened prior to returning requested information, resulting in wasted resources and poor user experience.

SUMMARY

The present invention includes a method and apparatus for forming a push notification and pushing the push notification and client state information to a client device. In addition, the present invention includes a method for processing the push notification and client state information. The method may further include embedding validation metadata and intelligent filtering metadata with the client state information.

Other features of the present invention will be apparent from the accompanying drawings and from the detailed description, which follows.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION

A method and apparatus for pushing notifications and client state information is described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, an intermediary node on a data communications network, such as a proxy, may implement a pushed notification and client state information including metadata. The intermediary node receives push notifications, which indicate resources, and client state information, to be pushed to wireless devices and affixes user-specific, device-specific, and/or application-specific metadata. According to one embodiment of the present invention, the metadata is included as a parameter within the client state information. Alternatively, the metadata may be separate from the client state information.

Pushing a notification with client state information reduces the overall bandwidth required for an activated notification. This is achieved by eliminating a roundtrip communication between the push initiator and client wireless device on an initial push transaction, and between the client wireless device and resource host on the resulting pull transaction prior to acquiring client state information. Furthermore, the addition of metadata to the client state information facilitates a policy-driven push methodology where validation metadata provides for more secure transactions. In addition, intelligent filtering metadata may provide additional capabilities during the transaction.

To facilitate description, the technique of affixing metadata to a push message is described herein as being implemented within a push proxy gateway. Note, however, that in other embodiments the technique may be implemented within other types of intermediary network nodes, such as switches, routers, gateways, and other similar devices.

Figure 2:
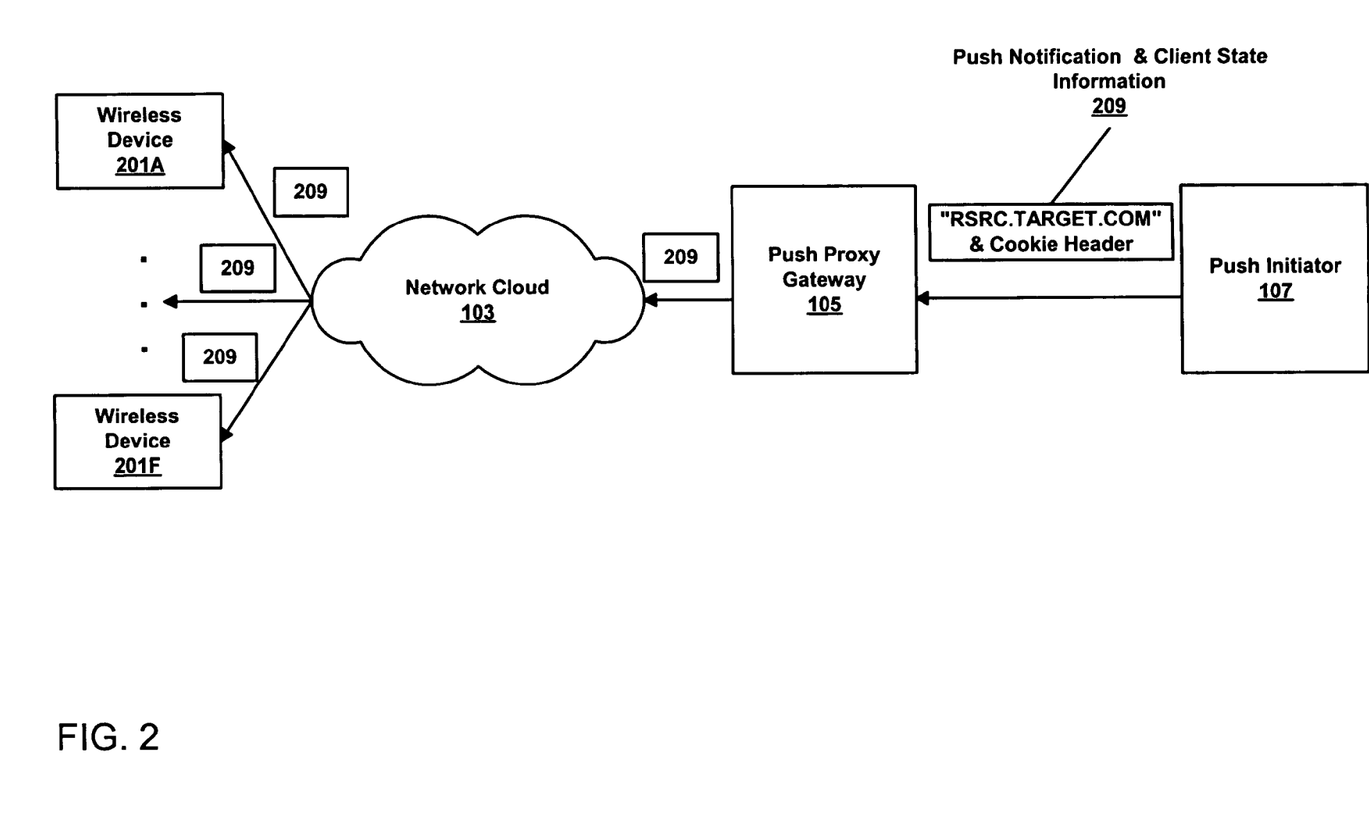
FIG. 2 illustrates an example of a push notification being pushed with client state information.

FIG. 2 illustrates an example of a push notification being pushed with client state information. A Push Initiator 107 may implement the delivery of the push notification and client state information through an HTTP submission. In one embodiment, the Push Initiator 107 initiates a cookie session by setting a cookie header within the HTTP headers section of the HTTP submission. In an alternative embodiment, client state information may include provisioning information which refers to a provisioned context on the device. The name-value information of the cookie header is maintained in a database that an origin server accumulates for its visitors. The Push Access Protocol (PAP) message (push notification) is sent with the HTTP submission as in the following example:

```
x-up-setcookie:name=value;        // client state information
domain="address.com"; path=/path;
discount="10";                     // usage token
"This is a notification."           // push notification
http://address/path                 // resource link
```

A complete PAP example code segment may be formatted in the following example:

```
POST /ppg:9002/ HTTP/1.1
Host:
Date: Sun, 10 Jan 2002 18:00:00 GMT
x-wap-application-id: x-wap-application:wml.ua
x-up-setcookie:name=value; domain="address.com"; path=/path;
discount="10";
Content-Type: multipart/related; boundary=asdlfkjiurwghasf;
type="application/xml"
Content-Length: 400
--asdlfkjiurwghasf
Content-Type: application/xml; charset=UTF-8
<?xml version="1.0"?>
        <!DOCTYPE pap PUBLIC "-//WAPFORUM//DTD PAP 2.0//EN"
            "http://www.wapforum.org/DTD/pap_2.0.dtd">
<pap product-name="PPGAgent">
        <push-message
        push-id="f81d4fae-7dec-11d0-a765@ppgagent.push.com"
        source-reference="PPGAgent version 1.0">
        <address address-value="WAPPUSH=fwills@push.com/
        TYPE=USER "/>
            <quality-of-service delivery-method="unconfirmed"/>
        </push-message>
</pap>
--asdlfkjiurwghasf
Content-type: text/vnd.wap.si; charset=UTF-8
<?xml version="1.0"?>
<!DOCTYPE si PUBLIC "-//WAPFORUM//DTD SI 1.0//EN"
        "http://www.wapforum.org/DTD/si.dtd">
<si>
<indication href = "http://SI_HREF">
This is a notification.
</indication>
</si>
    --asdlfkjiurwghasf-
```

In this example, the text "x-up-setcookie:name=value; domain="address.com"; path=/path; discount=

"10";" denotes the client state information. In one embodiment, the client state information may include a usage token, which may provide additional commercial incentive for the user to activate the resource link. For example, a usage token includes a discount coupon, promotional offer, and the like. The subsequent information denotes the push notification, including the resource link.

The Push Initiator 107 transmits the HTTP headers and PAP message, as the client state information and push notification 209, to a Push Proxy Gateway (PPG) 105. The PPG 105 processes the HTTP headers and push notification 209. The PPG 105 transmits to a network cloud 103 the push notification and the setcookie header 209. The network cloud 103 transmits the push notification and setcookie header 209 to a client wireless device(s) 201A-201F (e.g., pager, cell phone, etc.). A variety of other methods may be used to include client state information with a push notification.

The client wireless device(s) 201A-201F receive the push notification and the client state information 209. The client implementation recognizes the HTTP setcookie header as client state information and stores the cookie in a cookie database. The client implementation also recognizes the push notification and associated parameters under any push operational primitive. For example, the push notification may include parameters such as server push Id, client push Id, push headers, authenticated, trusted, last, push body, and acknowledge headers.

It may be advantageous to include metadata as a part of or separate from the client state information in order to validate a current application as the intended recipient.

Figure 3:
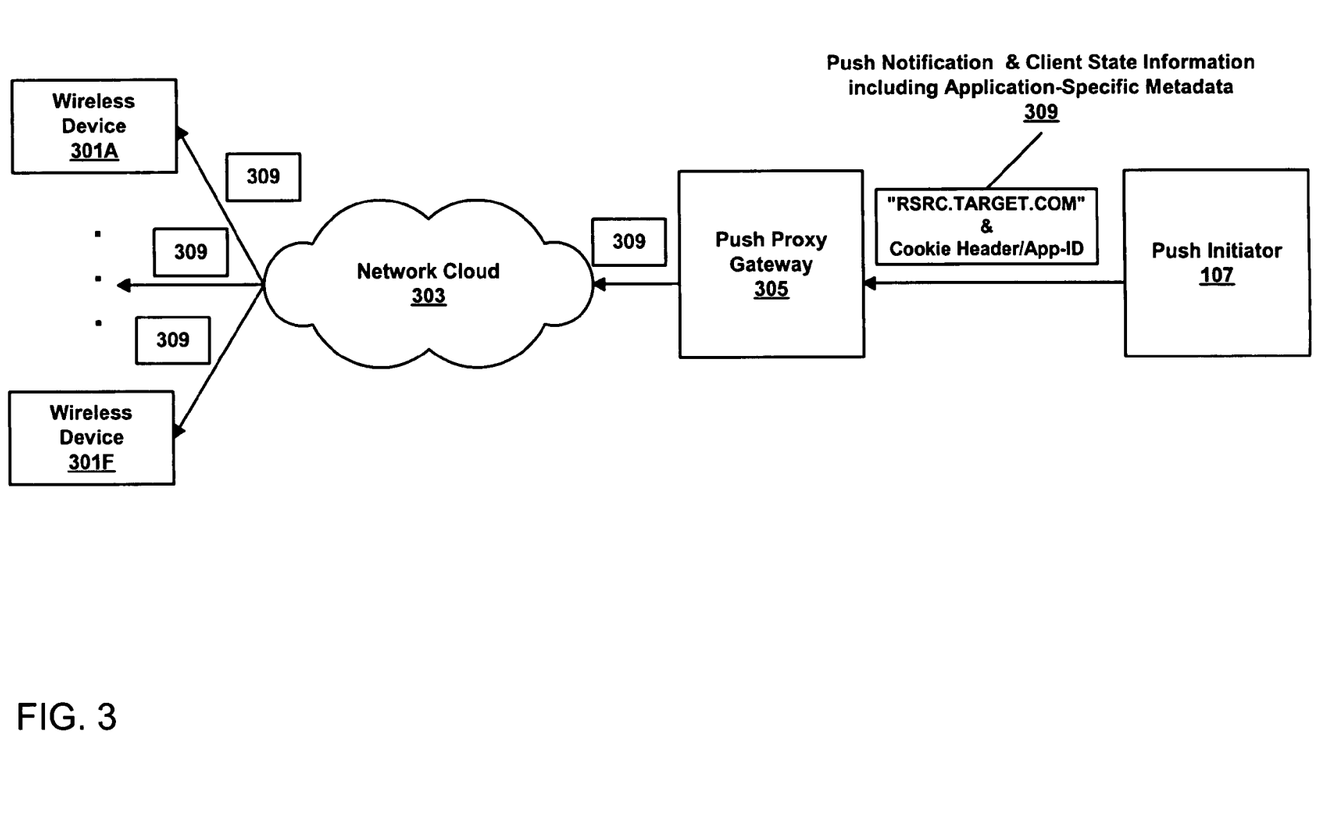
FIG. 3 illustrates an example of a push notification being pushed with client state information including application-specific metadata.

FIG. 3 illustrates an example of a push notification being pushed with client state information including application-specific metadata. In one embodiment, the cookie information is associated with the domain and an application identifier metadata. The cookie information is associated such that on a subsequent pull transaction, a target resource request sent by a client device will be delivered to the resource host with the accompanying cookie information if the domain is accessed by the intended application, as specified by an application identifier.

In one embodiment, the Push Initiator 107 targets a specific application on the wireless device with an application identifier. For example, the Push Initiator may include the header x-wap-application-id. In one embodiment, the application identifier is in the form of text. In another embodiment, the application identifier is in the form of an Open Mobile Alliance (OMA) registered token. The Push Initiator embeds the application identifier value as a parameter of the client state information. In one embodiment, application-specific metadata is added to the setcookie header and the Push Initiator 107 may send the setcookie header and push notification 309 as in the following example:

```
x-wap-application-id=0x02      // registered token
x-up-setcookie:name=value;  domain="address.com";
path=/path; discount="10";
"This is a notification"
http://address/path
```

Alternatively, the push proxy gateway may add the application-specific metadata above the cookie header. In another embodiment, the meta-data may be added to the push message as a separate component part of the Multipart Push Submission. The PPG 305 then receives and processes the push notification and client state information 309.

The PPG 305 pushes the push notification and the client state information with the application identifier 309 to the client wireless device(s) 301A-301F through the network cloud 303. The client device implementation reads the pushed information and saves the cookie/metadata information. The device reads the application-specific identification (Application ID) and the application as identified by the Application ID is located. The push notification is passed to the application.

Once the wireless client device receives the notification, the user of the device may then activate the resource link. Activation of the resource link results in a pull transaction, where the resource is fetched from the resource host. In order to limit access of the notification resource to the intended application on the device, validation of a requesting application is required.

Figure 4:
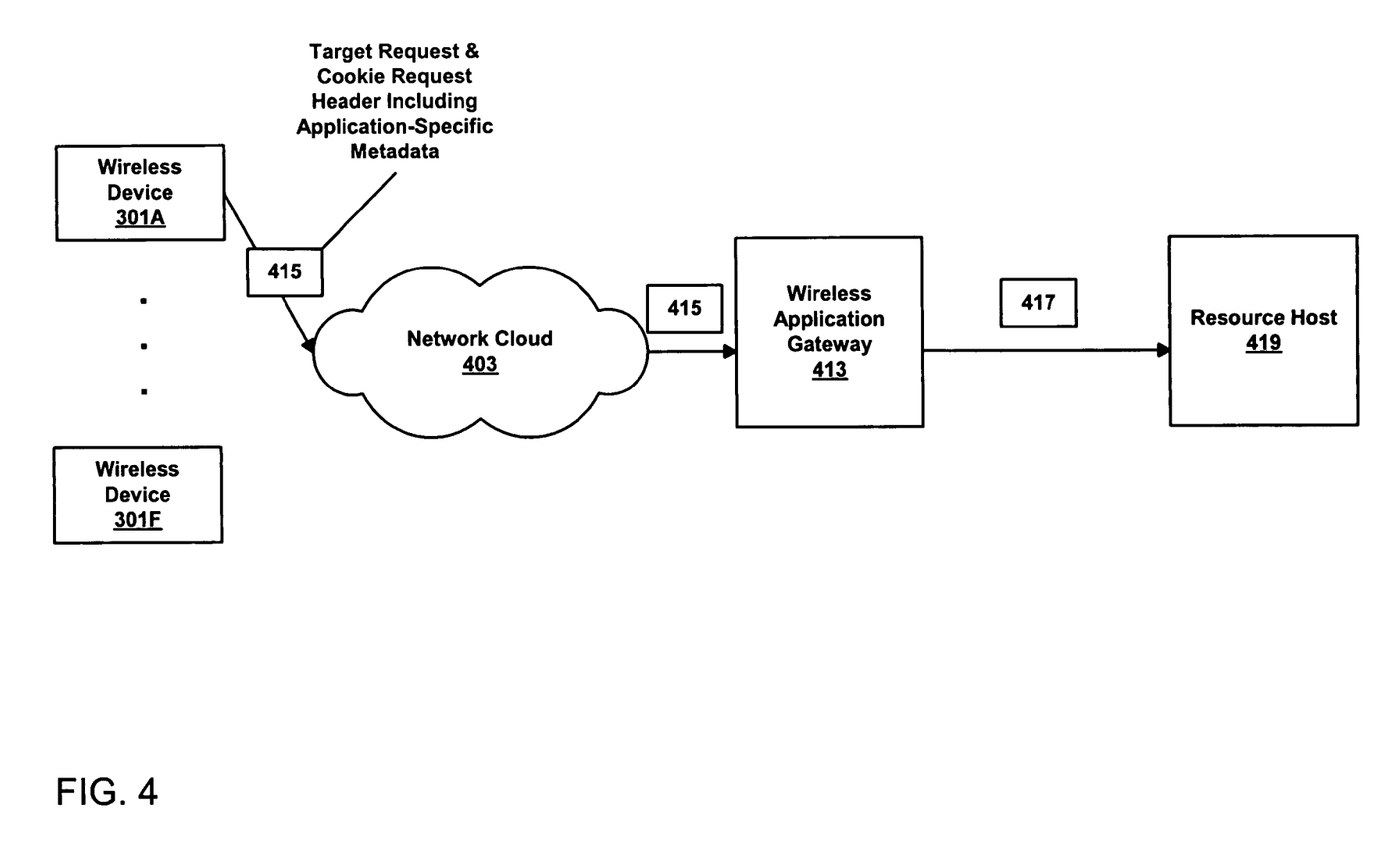
FIG. 4 illustrates an example of the validation of a particular application accessing a domain in a pull transaction according to one embodiment of the present invention.

FIG. 4 illustrates an example of the validation of a particular application accessing a domain in a pull transaction according to one embodiment of the present invention. A user at the wireless device 301A activates the previously received push notification via a current application running on the wireless device and requests the resource indicated by the push notification. The current application searches in the cookie database for the cookie(s) issued by the resource host 419.

Once the cookie(s) are located, the wireless device 301A transmits to the network cloud 403 a target resource request and the cookie request header including the application-specific metadata 415, as in the following example:

```
GET http://address/path HTTP/1.0
x-wap-application-id=0x02
Cookie: name=value; discount="10";
```

The network cloud 403 transmits the target resource request and cookie request header 415 to a wireless application gateway (WAG) 413. The WAG 413 determines if the application corresponding to the application identifier specified in the cookie request header is accessing the domain. In one embodiment, the WAG makes the determination by comparing the application requesting the resource with the application specified by the metadata. In one embodiment, the user agent header representing the application on the mobile device making the request may be compared to the application targeted by the Push Initiator or PPG in the initial push submission, as determined via a link to the PPG and reference to a PPG transaction log or the like.

In a case where the proper application requests to access the domain, the WAG may proceed by processing the resource request and cookie/metadata information. Processing may include stripping the request of the information added by the PPG. For example, the WAG may remove the application identifier from the metadata portion of the cookie request header. In another embodiment, the application identifier added by a Push Initiator is not removed from the cookie information. The WAG 413 may then transmit the resource request and cookie information 417 to the resource host 419, as in the following example:

```
GET http://address/path HTTP/1.0
x-wap-application-id=0x02
Cookie: name=value; discount="10";
```

In a case where the requesting application is not successfully validated, the cookie request header is not passed with the resource request. Accordingly, the WAG 413 may transmit to the resource host 419 a target resource request, as in the following example:

---
GET http://address/path HTTP/1.0
---

Although the inclusion of application-specific metadata may ensure the intended application accesses the resource with the associated cookie information, user-specific metadata may be included to validate a user attempting to access the resource.

Figure 5:
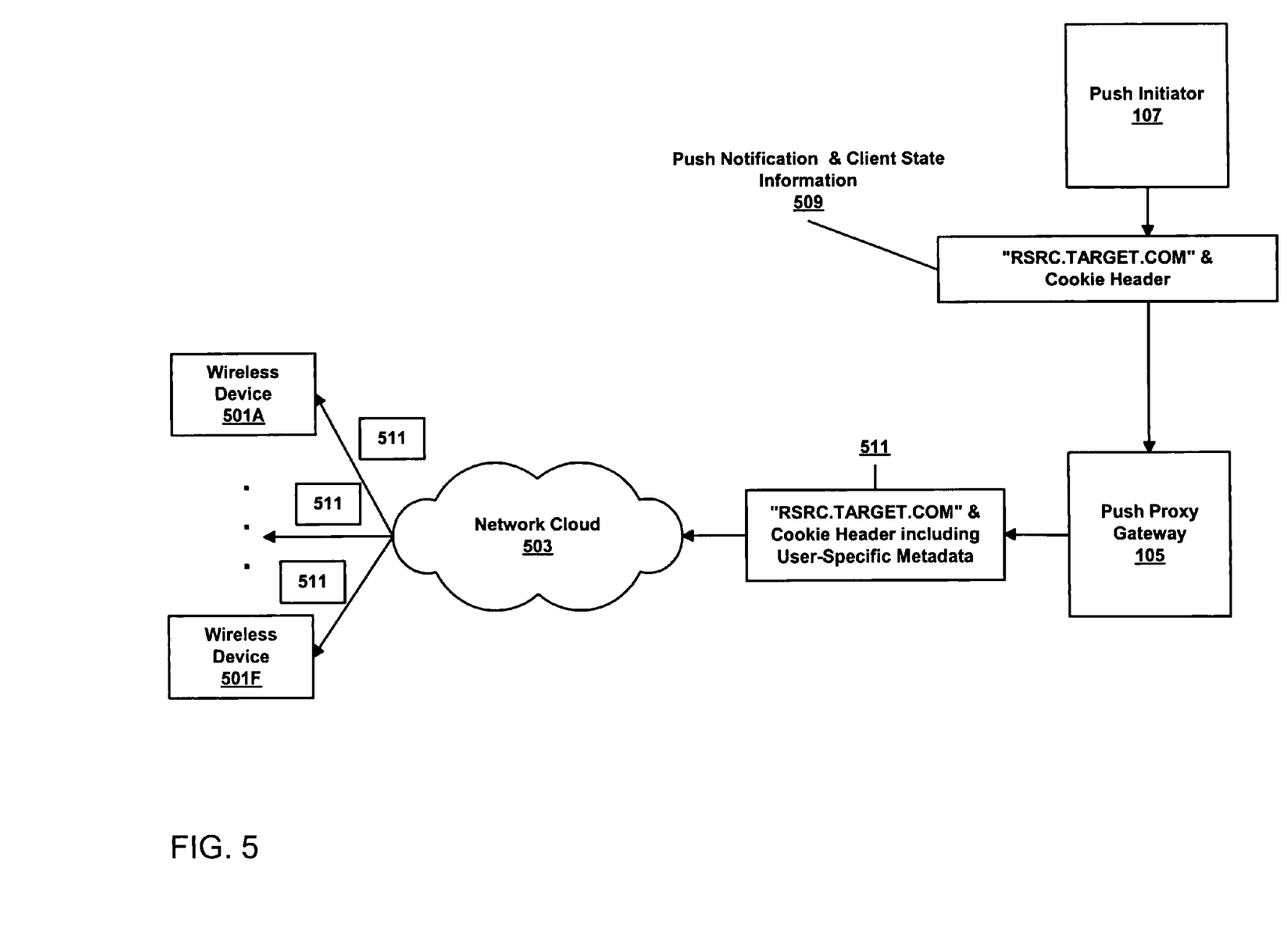
FIG. 5 illustrates an example of a push notification being pushed with client state information including user-specific authentication metadata.

FIG. 5 illustrates an example of a push notification being pushed with client state information including user-specific authentication metadata. A Push Initiator 107 transmits client state information and a push notification 509 to a PPG 105. The push notification indicates a resource link (e.g., a URI) and a client wireless device address. The client device address is located in the control portion of the push message. In one embodiment, the client address in the push notification may follow a user-specific identifier scheme (e.g., logical address) as in the following example:

---
x-up-setcookie:name=value; domain="address.com"; path=/path; discount="10";
WAPPUSH=username@carrier.com/TYPE=USER    //logical
WAPPUSH=1234567890/TYPE=USER              //addresses
"This is a notification"
http://address/path
---

The PPG 105 receives and processes the push notification and client state information 509. Where the addressing scheme is user-specific, addressing that allows a user to be addressed without the Push Initiator also supplying the physical identity of the device, processing may include mapping the given logical user address to a physical device. The PPG may perform a look-up in a database to determine the appropriate physical address for the intended user. Processing may further include adding authentication metadata to the push notification specifying an intended user on the client device. In one embodiment, user-specific logical address metadata may be added above a setcookie header as in the following example:

---
x-up-setcookie:name=value; domain="address.com";
path=/path; discount="10";
x-ppg-user="username@carrier.com"
"This is a notification"
http://address/path
---

In another embodiment, the meta-data may be added to the push message as a separate component part of the Multipart Push Submission. The cookie/metadata information and push message 511 are transmitted through the network cloud 503 to the device(s) 501A-501F according to the physical address supplied from the logical-to-physical mapping.

Once the wireless client device receives the notification, a current user of the device may then activate the resource link. In order to limit access of the notification resource link to the intended user, validation of the current user is required.

Figure 6:
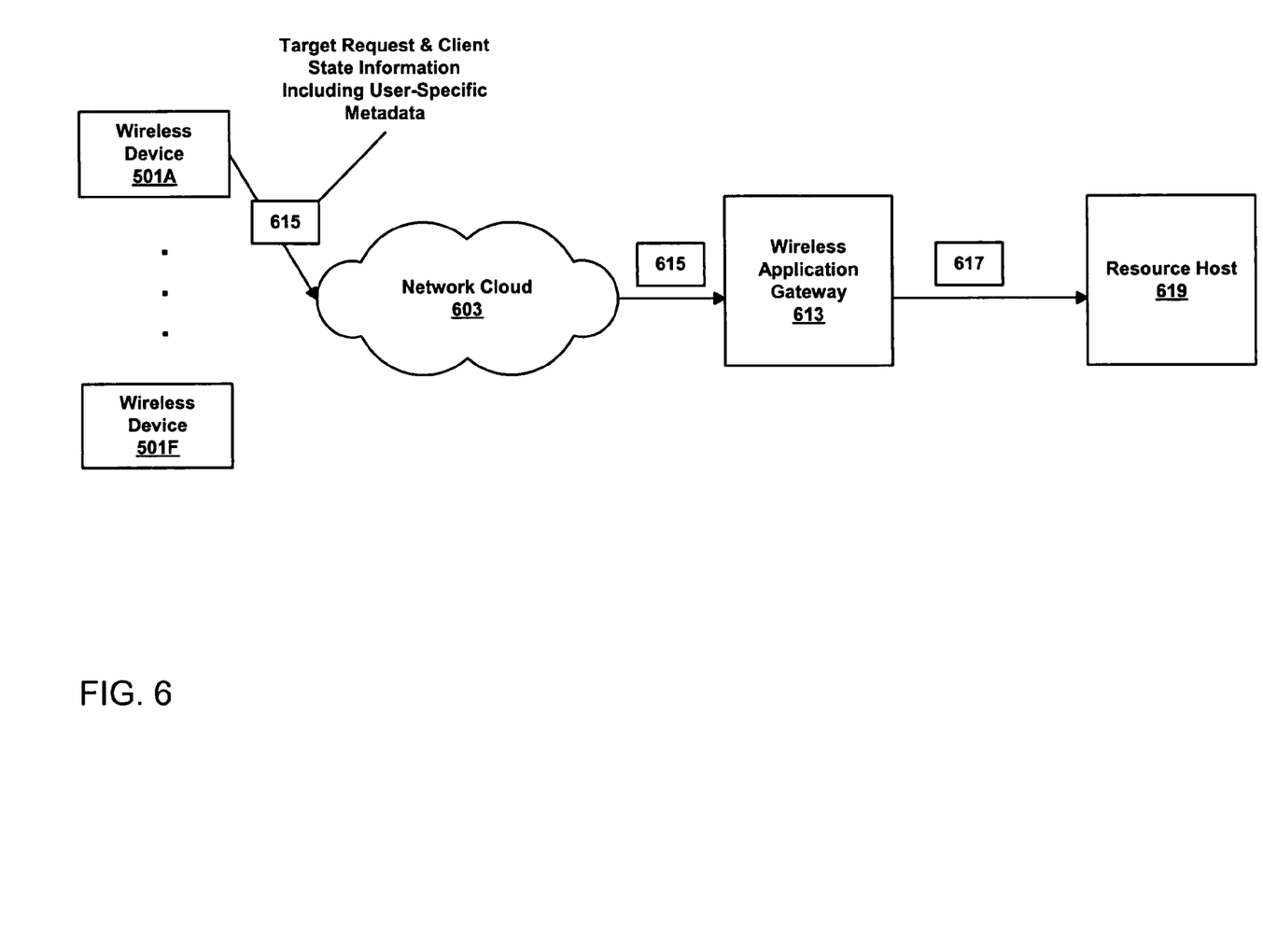
FIG. 6 illustrates an example of the validation of a particular user accessing a domain in a subsequent pull transaction according to one embodiment of the present invention.

FIG. 6 illustrates an example of the validation of a particular user accessing a domain in a subsequent pull transaction according to one embodiment of the present invention. The WAG 613 may validate the current user on a subsequent pull transaction, where the current user at the wireless device 501A activates the previously received push notification and sends, via the network cloud 603, a target resource request and cookie request header including user-specific metadata 615, as in the following example:

---
GET http://address/path HTTP/1.0
Cookie: name=value; discount="10";
x-ppg-user="username@carrier.com"
---

The WAG 613 may validate the current user as the intended user by comparing the known current user information with the logical address metadata. The known current user information may include previously attained login information, including a subscription identification (e.g., username@ppg.carrier.com), network identification, device identification, or application level authentication, such as HTTP-based authentication, Secure Sockets Layer (SSL), and Wireless Transport Layer Security (WTLS).

In a case where an improper user requests for a domain, the WAG 613 may deny the request and issue an error. Alternatively, the WAG 613 may transmit the target resource request, but not the cookie request header, to the resource host 619. In a case where the proper user requests to access the domain, the WAG 613 may proceed by processing the target resource request and cookie/metadata information 615. Processing may include stripping the information added by the PPG from the cookie/metadata information. For example, the WAG 613 may remove the user-specific metadata from the cookie request header. After processing, the WAG 613 transmits the target resource request and cookie request header 617 to the resource host 619.

The foregoing examples of added metadata may be implemented in combination with each other in order to achieve a secure and more rigorous validation of the resource requesting application, device, and/or user.

Furthermore, intelligent filtering metadata, such as sequence metadata and Push Initiator metadata, may supplement client state information by providing additional functionality.

In one embodiment, a Push Initiator transmits a series of push notifications and cookie information with sequence number metadata. In one embodiment, sequence metadata may be added above a setcookie header as in the following example:

---
x-up-setcookie:name=value; domain="address.com";
path=/path;
x-up-seqnum="1"
"This is a notification"
http://address/path
---

The PPG processes and transmits the push notifications and cookie information with sequence number metadata to the client. The client executes the notifications according to the notification sequence number.

In another embodiment, a PPG may process a push notification and accompanying state information by adding metadata describing the identity of the push initiator. The PPG may acquire the push initiator metadata by many ways, including extracting the information from certificates on secure Transmission Control Protocol (TCP) connections and from reverse Domain Name System (DNS) lookups. In one embodiment, push initiator identification metadata may be added above a setcookie header as in the following example:

```
x-up-setcookie:name=value; domain="address.com";
path=/path; discount="10";
x-ppg-PushInitiatorID="www.pushapp.com"
"This is a notification"
http://address/path
```

The PPG may then transmit the push notification and client state information including the push initiator metadata to the client device. In another embodiment, the push initiator may provide the metadata. The client device may refer to the push initiator metadata prior to requesting the resource indicated by the push notification. In essence, the push initiator metadata may be indicative of trustworthiness, quality, and other attributes of the resource host and/or push initiator.

The foregoing examples of metadata may be implemented in any combination in order to provide intelligent filtering capabilities using the push framework and to achieve secure validation of the resource requesting application, device, and/or user.

Figure 7:
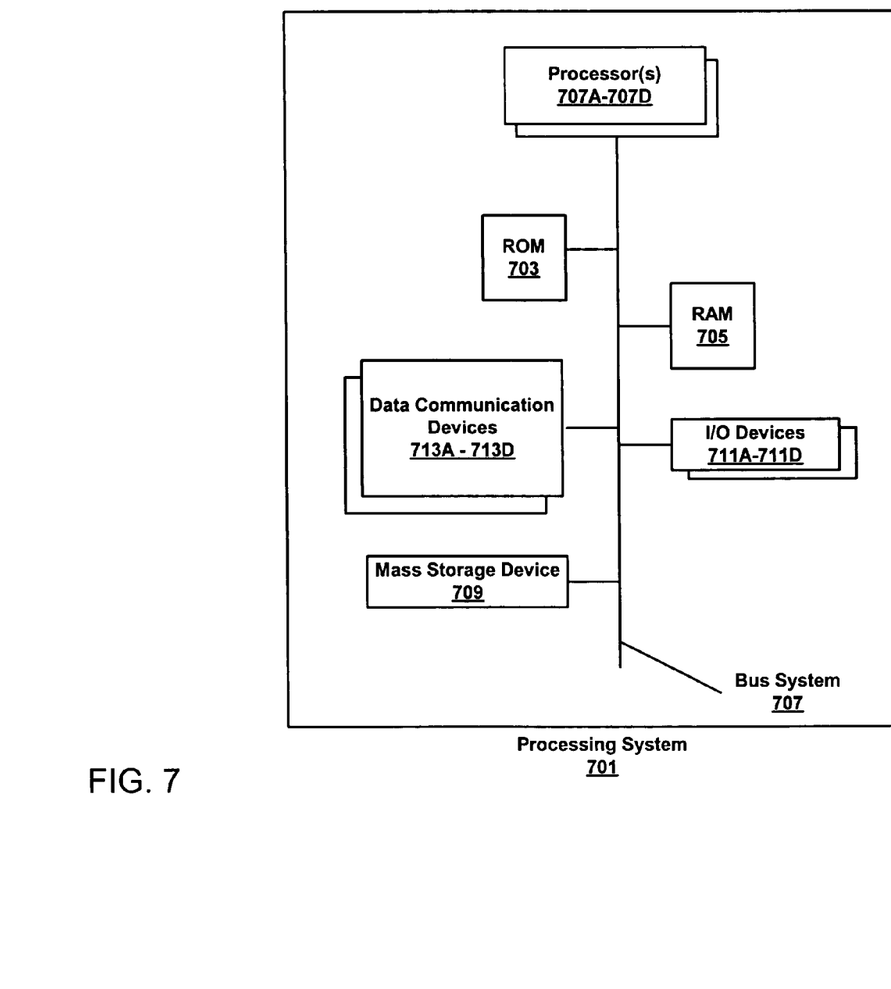
FIG. 7 is a high-level block diagram showing an example of a processing system which may be used to implement any of the devices mentioned herein, e.g., a proxy, or a gateway.

FIG. 7 is a high-level block diagram showing an example of a processing system which may be used to implement any of the devices mentioned above, e.g., a wireless client device, proxy, gateway, push initiator, resource host, etc. Note that FIG. 7 is a high-level conceptual representation, which is not intended to depict any one specific physical arrangement of components; such details are not germane to the present invention and are well within the knowledge of those skilled in the art. As shown, a processing system 701 includes one or more processors 707A-707D, i.e. a central processing unit (CPU), read-only memory (ROM) 703, and random access memory (RAM) 705 each connected to a bus system 707. The processor(s) 707A-707D may be, or may include, one or more programmable general-purpose or special-purpose microprocessors or digital signal processors (DSPs), application specific integrated circuits (ASICs), programmable logic devices (PLDs), or a combination of such devices. The bus system 707 includes one or more buses, which may be connected to each other through various bridges, controllers and/or adapters, such as are well known in the art. For example, the bus system 707 may include a "system bus", which may be connected through one or more adapters to one or more expansion buses, such as a Peripheral Component Interconnect (PCI) bus, lightning data transport (LDT) bus, Hyper-Transport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 707 are a mass storage device 709, (optionally) a number of I/O devices 711A-711D, and one or more data communication devices 713A-713D. Mass storage device 709 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

Each data communication device 713A-713D is a device suitable for enabling the processing system to communicate with remote devices and may be, for example, a conventional modem, a Digital Subscriber Line (DSL) modem, a cable modem, an Ethernet adapter, an Integrated Services Digital Network (ISDN) adapter, a wireless transceiver (e.g., in the case of a mobile device), a satellite transceiver, or the like. The I/O device(s) 711A-711D may include, for example, a keyboard or keypad, a monitor, and a pointing device (e.g., a mouse, trackball, or touchpad). Note, however, that such I/O devices may be unnecessary for certain devices and/or in certain embodiments. For example, a proxy or origin server does not necessarily require local I/O devices, particular if the proxy or origin server is not intended to directly interface with a user or operator. Similarly, a mobile device may not require a mass storage device. Many other variations on the above described embodiment other possible.

The elements of the processing system 701 include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes the ROM, RAM, the mass storage device (e.g., magnetic disk storage media, optical storage media, flash memory devices), electrical, optical, acoustical, or other forms of propagated signals (e.g., carrier waves, infrared signals, digital signals, etc.), etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method comprising:
   forming a push message including:
      a push notification that indicates a link to a resource on a resource host, and
      client state information including information for initiating a cookie session, and
      pushing the push message to a client device via a push proxy gateway.

2. The method of claim 1, wherein the client state information includes metadata specifying a target application, and when a user pulls information using the push notification, the metadata specifying the target application is used to validate the client device to access the target application.

3. The method of claim 1, wherein the client state information includes metadata specifying an intended receiving user, and the metadata specifying the intended receiving user is used to logically map a user with the client device.

4. The method of claim 1, wherein the client state information includes metadata specifying a push notification initiator, and when a user pulls information using the push notification, the metadata specifying a push notification initiator is used to validate the pulling of the information.

5. The method of claim 1, wherein the information for initiating a cookie session is a cookie header within an HTTP headers section of the push message.

6. A method comprising:
   receiving a push message including:
      a push notification that indicates a link to a resource on a resource host, and
      client state information including information for initiating a cookie session;
   processing the push notification and the client state information; and
   transmitting the push message to a client device.

7. The method of claim 6, wherein the receiving, processing, and transmitting is performed by a push proxy gateway.

8. The method of claim 6,
wherein the client state information includes metadata specifying an intended application on the client device to receive the push notification.

9. The method of claim 8, further comprising:
in response to the push notification, receiving, from the client device, a request for the resource and a request for client state information on a pull transaction, wherein the request for client state information includes the metadata specifying the intended application;
determining if the intended application specified by the metadata is requesting the resource on the resource host;
transmitting the request for the resource and the request for client state information to the resource host if it is determined that the intended application is requesting the resource; and
transmitting the request for the resource to the resource host if it is determined that the intended application is not requesting the resource.

10. The method of claim 9, wherein determining if the intended application specified by the metadata is requesting the resource on the resource host comprises:
comparing the metadata specifying the intended application with an application on the client device requesting the resource.

11. The method of claim 9, wherein the receiving, determining, transmitting the request for the resource and the request for client state information, and transmitting the request for the resource is performed by a wireless application gateway.

12. The method of claim 6, wherein the client state information includes metadata specifying an intended receiving user, and processing the push notification and the client state information comprises:
identifying a user identification from the metadata specifying the intended receiving user, wherein the user identification specifies an intended user on the client device to receive the push notification;
mapping the user identification to a physical device address; and
embedding the mapping information with the client state information.

13. The method of claim 12, further comprising:
in response to the push notification, receiving, from the client device, a request for the resource and a request for client state information on a pull transaction, wherein the request for client state information includes the user identification;
comparing the user identification to current user information to determine if the user identification corresponds to the current user information;
if it is determined that the user identification corresponds to the current user information:
removing the user identification from the request for client state information; and
transmitting the request for the resource and the request for client state information to the resource host, and
if it is determined that the user identification does not correspond to the current user information:
denying the request for the resource and issuing an error, or
transmitting the request for the resource but not the request for client state information to the resource host.

14. The method of claim 13, wherein the current user information includes at least one of a logical address of a current user and authentication information of the current user.

15. The method of claim 13, wherein the receiving, comparing, removing, transmitting the request for the resource and the request for client state information, denying, and transmitting the request for the resource but not the request for client state information, are performed by a wireless application gateway.

16. The method of claim 6, wherein the information for initiating a cookie session is a cookie header within an HTTP headers section of the push message.

17. A method comprising:
receiving a push message including:
a push notification that indicates a link to a resource on a resource host, and
client state information including information for initiating a cookie session;
reading the client state information; and
associating the client state information with the link to the resource.

18. The method of claim 17, wherein the receiving, reading, and associating is performed by a client device.

19. The method of claim 17, wherein the client state information includes metadata specifying a push notification initiator, and wherein associating comprises:
storing the client state information;
forming a request for client state information for a pull transaction based on the metadata included in the received client state information; and
transmitting a request for the resource and the request for client state information to a wireless application gateway based on activation of the link to the resource.

20. The method of claim 17, wherein the information for initiating a cookie session is a cookie header within an HTTP headers section of the push message.

21. A processing system comprising:
a processor; and
a memory containing instructions, which, when executed by the processor, cause the processing system to perform a method comprising:
forming a push message including:
a push notification that indicates a link to a resource on a resource host, and
client state information including information for initiating a cookie session; and
pushing the push message.

22. The method of claim 21, wherein the information for initiating a cookie session is a cookie header within an HTTP headers section of the push message.

23. A processing system comprising:
a processor; and
a memory containing instructions, which, when executed by the processor, cause the processing system to perform a method comprising:
receiving a push message including:
a push notification that indicates a link to a resource on a resource host, and
client state information including information for initiating a cookie session;
processing the push notification and client state information; and
transmitting the push message to a client device.

24. The processing system of claim 23,
wherein the client state information includes metadata specifying an intended application on the client device to receive the push notification.

25. The processing system of claim 23 wherein the client state information includes metadata specifying an intended receiving user and processing the push notification and the client state information comprises:

identifying a user identification from the metadata specifying the intended receiving user, wherein the user identification specifies an intended user on the client device to receive the push notification;

mapping the user identification to a physical device address; and embedding the mapping information with the client state information.

26. The method of claim 23, wherein the information for initiating a cookie session is a cookie header within an HTTP headers section of the push message.

27. A processing system comprising:

a processor; and a memory containing instructions, which, when executed by the processor, cause the processing system to perform a method comprising:

receiving a push message including:

a push notification that indicates a link to a resource on a resource host, and client state information including information for initiating a cookie session, reading the client state information, and associating the client state information with the link to the resource.

28. The processing system of claim 27 wherein the client state information includes metadata specifying a push notification initiator and associating the client state information comprises:

storing the client state information;

forming a request for client state information for a pull transaction based on the metadata included in the received client state information, and transmitting a request for the resource and the request for client state information to a wireless application gateway based on activation of the link to the resource.

29. The method of claim 27, wherein the information for initiating a cookie session is a cookie header within an HTTP headers section of the push message.

30. A processing system comprising:

a processor; and a memory containing instructions, which, when executed by the processor, cause the processing system to perform a method comprising:

receiving, from a client device, a request for a resource and a request for client state information on a pull transaction, wherein the request for client state information includes a target application identifier specifying an intended application on the client device to receive a push notification, the push notification indicates a link to a resource on a resource host, and the request for a resource indicates a request for the resource on the resource host, determining if the intended application specified by the target application identifier is requesting the resource on the resource host, transmitting the request for a resource and the request for client state information to the resource host if it is determined that the intended application is requesting the resource, and transmitting the request for a resource to the resource host if it is determined that the intended application is not requesting the resource.

31. A processing system comprising:

a processor; and a memory containing instructions, which, when executed by the processor, cause the processing system to perform a method comprising:

receiving, from a client device, a request for a resource and a request for client state information on a pull transaction, wherein the request for client state information includes an intended user identification specifying an intended user on the client device to receive a push notification, the push notification indicating a link to a resource on a resource host, and the request for a resource indicating a request for the resource on the resource host, determining if the intended user specified by the intended user identification is requesting the resource on the resource host, if it is determined that the intended user is requesting the resource:

removing the intended user identification from the request for client state information, and transmitting the request for a resource and the request for client state information to the resource host, and if it is determined that the intended user is not requesting the resource:

denying the request for the resource and issuing an error, or transmitting the request for the resource but not the request for client state information to the resource host.

\* \* \* \* \*